United States Patent
Frenal et al.

(10) Patent No.: US 9,328,867 B2
(45) Date of Patent: May 3, 2016

(54) FILLING CONNECTOR, CONTAINER, FILLING METHOD AND FILLING NOZZLE

(75) Inventors: Antoine Frenal, Ezanville (FR); Cyril Manscourt, Vanves (FR); Philippe Pisot, Apprieu (FR)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 184 days.

(21) Appl. No.: 14/234,803

(22) PCT Filed: Jul. 6, 2012

(86) PCT No.: PCT/FR2012/051597
§ 371 (c)(1),
(2), (4) Date: Jan. 24, 2014

(87) PCT Pub. No.: WO2013/014355
PCT Pub. Date: Jan. 31, 2013

(65) Prior Publication Data
US 2014/0174594 A1    Jun. 26, 2014

(30) Foreign Application Priority Data
Jul. 26, 2011 (FR) .................................. 11 56785

(51) Int. Cl.
*F16K 1/30* (2006.01)
*F17C 5/06* (2006.01)

(52) U.S. Cl.
CPC . *F17C 5/06* (2013.01); *F16K 1/303* (2013.01); *F16K 1/308* (2013.01)

(58) Field of Classification Search
CPC ............ F17C 5/06; F16K 1/303; F16K 1/308
USPC ........................... 141/347–347, 349, 353, 383
See application file for complete search history.

(56) References Cited

U.S. PATENT DOCUMENTS

| 4,139,469 | A | * | 2/1979 | Rainin ................. | B01D 15/166 137/512 |
| 5,150,880 | A | * | 9/1992 | Austin, Jr. ............ | F16L 37/096 137/614.05 |

(Continued)

FOREIGN PATENT DOCUMENTS

| DE | 20 2006 014061 | 11/2006 |
| EP | 0 393 234 | 10/1990 |

(Continued)

OTHER PUBLICATIONS

French Search Report and Written Opinion for FR1156785, Mar. 27, 2012.

(Continued)

*Primary Examiner* — Nicolas A Arnett
(74) *Attorney, Agent, or Firm* — Elwood L. Haynes; Allen E. White (57) ABSTRACT

Filling connector comprising a body (2) defining an internal filling circuit (6) between an upstream end (3) and a downstream end (4), with the connector comprising an isolation valve element (7) mobile relatively to a seat (8) between an upstream position in which the circuit is closed and a downstream position in which the circuit is open, with the connector (1) further comprising a dust valve element (10, 100) positioned upstream of the isolation valve element (7), characterised in that the dust valve element (10, 100) can be moved selectively towards downstream either:
  a) in a first set downstream position referred to as "without contact" which opens the upstream end (3) of the circuit (6), or in
  b) a second set downstream position referred to as "contact" which opens the upstream end (3) of the circuit (6).

12 Claims, 3 Drawing Sheets

(56) References Cited

U.S. PATENT DOCUMENTS

| | | | | |
|---|---|---|---|---|
| 5,413,230 A * | 5/1995 | Folter | .................. | A23L 2/54 137/544 |
| 5,482,083 A | 1/1996 | Jenski | | |
| 6,343,630 B1 * | 2/2002 | Dubinsky | ............ | F16L 37/0848 137/614.05 |
| 6,571,834 B2 * | 6/2003 | Takeda | .................. | F16K 1/305 141/18 |
| 6,607,007 B1 * | 8/2003 | Hull | .................. | F16K 1/302 137/493.9 |
| 7,341,075 B2 * | 3/2008 | Taylor | .................. | B63C 11/2227 128/205.22 |
| 8,408,247 B2 * | 4/2013 | Pisot | .................. | F16K 1/306 137/613 |
| 8,695,651 B2 * | 4/2014 | Frenal | .................. | F16K 1/303 137/512 |
| 8,701,723 B2 * | 4/2014 | Frenal | .................. | F16K 1/303 137/512 |
| 2010/0308060 A1 | 12/2010 | Lammers | | |
| 2010/0326540 A1 | 12/2010 | Moretti et al. | | |
| 2014/0182740 A1 * | 7/2014 | Frenal | .................. | F16K 1/303 141/1 |

FOREIGN PATENT DOCUMENTS

| | | |
|---|---|---|
| FR | 1 543 482 | 10/1968 |
| GB | 1 019 524 | 2/1966 |
| WO | WO 2009 101350 | 8/2009 |

OTHER PUBLICATIONS

International Search Report for PCT/FR2012/051597, Sep. 26, 2012.
Written Opinion for corresponding PCT/FR2012/051597, Sep. 26, 2012.

\* cited by examiner

FILLING CONNECTOR, CONTAINER, FILLING METHOD AND FILLING NOZZLE

CROSS REFERENCE TO RELATED APPLICATIONS

This application is a 371 of International PCT Application PCT/FR2012/051597, filed Jul. 6, 2012, which claims priority to French Patent Application No. FR 1156785 filed Jul. 26, 2011, the entire contents of which are incorporated herein by reference.

BACKGROUND

This invention relates to a filling connector, a tap, a container of fluid under pressure, a method and an outlet for filling using such a connector.

SUMMARY

The invention relates more particularly to a filling connector for a container of fluid under pressure intended to cooperate with a filling outlet in order to allow for the filling of said container, with the connector comprising a body defining an internal filling circuit between an upstream end intended to be connected to a filling outlet and a downstream end intended to be connected to a container, with the connector comprising an isolation valve element able to move relative to a seat between an upstream position in which the circuit is closed and a downstream position in which the circuit is open, said isolation valve element being urged into its upstream position by a return member, with the connector further comprising a dust valve element positioned upstream of the isolation valve element, said dust valve element comprising a downstream end and able to move relative to the body between an upstream position in which the upstream end of the circuit is closed and a downstream position in which the upstream end of the circuit is open, said dust valve element being urged into its upstream position by at least one return member.

This invention relates in particular to a filling connector comprising in series, from upstream to downstream, a dust valve element and an isolation valve element (the terms "upstream" and "downstream" refer to the direction of flow of the gas during a filling).

The dust valve element is provided in particular to form a barrier upstream of the isolation valve element in order to prevent or limit the intrusion of particles or dust that can impair the seal of said isolation valve element.

Generally, filling connectors comprise a dust plug that retracts in contact with the end of the filling outlet in order to allow the filling outlet to move into the filling connector in order to actuate the isolation valve element located downstream in the filling connector. This generally constitutes good protection against the intrusion of foreign bodies in a filling connector. However, this protection is generally not sufficient because, when the dust valve element is open, the filling outlet that penetrates into the filling connector downstream of the dust valve element can bring particles.

Pollution of the isolation valve element can result in a substantial rate of leakage during the service life of the product whereon is mounted this filling connector. This can be explained by the fact that the sealed zone of the polluted isolation valve element (dust, particles, etc.) loses a substantial portion of its seal. This risk of intrusion of particles is increased when the filling connector is vertical (filling from the top).

A known solution consists in providing a filter for solid particles in the connector, upstream of the isolation valve element. This makes it possible to retain particles or dust upstream of the isolation valve element but does not make it possible to actuate the opening of the isolation valve element by mechanical contact (as the filter in fact forms a mechanical barrier for a valve pusher).

Another solution consists in providing a filter downstream of the isolation valve element. This allows for the mechanical actuating of the isolation valve element and protects from dust the downstream of the isolation valve element (the inside of the tap and the inside of the container). However, the upstream end of the isolation valve element is then subject to pollution by particles or dust that can affect its seal.

The management of the seal with regards to the exterior between the filling outlet (i.e. a filling tool) and the filling connector is also an issue. Generally, the filling outlet comprises seals that cooperate with the filling connector. These seals are substantially stressed during successive filling operations. This requires the O-rings to be changed frequently.

WO2009101350 discloses a device for filling and for distributing gas from a reservoir of gas under pressure comprising a withdrawal duct provided with a regulator and two valve elements positioned in series and which can be actuated by a user system in order to withdraw the gas. In order to fill the reservoir, a bypass is carried out over a portion of the withdrawal duct forming a filling channel short-circuiting one of the two valve elements and the regulator of the withdrawal duct.

A purpose of this invention is to overcome all or some of the disadvantages of the prior art mentioned hereinabove.

For this purpose, the connector according to the invention, moreover in accordance with the generic definition that is given by the preamble hereinabove, is substantially characterised in that the dust valve element can be moved selectively heading downstream, either:

in a first set downstream position referred to as "without contact" opening the upstream end of the circuit, wherein the downstream end of the dust valve element does not press against the upstream end of the isolation valve element, the upstream end of the isolation valve element able to be pressed towards its downstream position in which the circuit is open by fluid under pressure entering through the open upstream end of the circuit, or in a second set downstream position referred to as "contact" opening the upstream end of the circuit, wherein the downstream end of the dust valve element comes to push an upstream end of the mobile isolation valve element mobile in order to move via contact the isolation valve element towards its downstream position in which the circuit is open, the dust valve element comprising one or more passages for guiding at least part of the flow of fluid passing from upstream to downstream through the body of said dust valve element, with the dust valve element comprising a first and a second concentric parts able to be moved in relation to each other according to the upstream-downstream direction.

Such an arrangement makes it possible to improve the reliability and the safety of the filling system. Indeed, the dust valve element guides and forces the flow of entering gas during the filling during its transit heading downstream. The passage ducts passing through the dust valve element can in particular make it possible to decrease the turbulence of the gas during the filling. In this way, the vibrations generated are also reduced. A convergence of the flow or flows passing through the dust valve element can make it possible to accelerate the flow of gas and to concentrate it towards a central zone of the passage, in particular on the opening of the seat (upstream portion of the downstream isolation valve element).

This configuration makes it possible to spare at least partially the spring of the valve from the flow of the filling gas. This guiding of the filling gas can also make it possible to direct the flow of gas towards the zone forming the seat for the downstream isolation valve element, assisting its cleaning at each filling. This makes it possible to reduce the risks of leaks caused by a seat of a dirty isolation valve element.

Such an arrangement of the dust valve element in two portions (two concentric parts for example) also makes it possible to improve the safety of the seal during the filling. Indeed, the dust valve element with two separate parts that are relatively movable in the downstream direction makes it possible to produce a static seal between the filling clamp and the inlet of the connector and to provide at the same time a separate dynamic actuation of the isolation valve element. The isolation valve element is pushed selectively heading downstream (towards its open position) preferably by a mobile portion of the dust valve element). This part of the dust valve element that actuates (pushes) the isolation valve element does not provide a seal but is under a sealed atmosphere thanks to another static portion of the filling outlet. That is to say, the mobile part that opens the isolation valve element does not stress a seal dynamically, the seal of the filling outlet remains static. This protects the seal from wear and tear and other dynamic stresses.

The configuration thus makes it possible to significantly improve the safety of the bottle during its multiple fillings.

This architecture also makes it possible to protect the isolation valve element during successive filling operations.

In this way, in closed position the upstream dust valve element protects the downstream isolation valve from dust but also protects the downstream isolation valve from contact direct with the end of a filling outlet.

In addition, this architecture with double mobile valve elements in series sliding according to the same axis forms an effective protective mechanism in a filling process allowing for improved protection of the downstream isolation valve element.

The arrangement of the two valve elements in series makes it possible to effectively cooperate with a determined filling outlet.

In particular, the sliding dust valve element can allow for the opening of the upstream of the connector while
   protecting the downstream isolation valve element from particles and
   allowing for the actuating of this downstream isolation valve element by mechanical contact.

The arrangement of the upstream dust valve element and of the downstream isolation valve element also easily cooperates with filling outlets that provide for the opening of the downstream isolation valve element via a flow of gas under pressure delivered in the connector (instead of a mechanical contact).

In addition, the dust valve element regulates the flow of entering gas during a filling as the gas is forced to pass through the body of the dust valve element. This advantageously regulates the flow of gas towards the downstream portion by minimising the turbulence harmful to the mechanics of the isolation valve element.

The arrangement of the connector with double valve elements in series thus guarantees a high degree of protection of the isolation valve element against dirt and offers opening sequences that are adapted to different types of fillings.

The invention offers a high degree of safety in the opening/closing sequences of the filling connector. In addition, the filling according to the invention preserves the seal of the connector during the service life of the connector.

Thus, for example, and without this being limitative, the upstream dust valve element can advantageously participate in the mechanical opening of the downstream isolation valve element by transmitting an opening force from upstream to downstream. That is to say, in certain filling configurations, the dust valve element can form a member for transmitting movement between a filling outlet and the downstream isolation valve element.

Likewise, the mobile dust valve element can provide for the opening of the upstream of the connector allowing for the opening of the downstream isolation valve element with the pressure of the filling gas (according to the pressures and rating of the valve elements).

The upstream dust valve element can as such provide the following functions:
   the opening/closing of the upstream of the circuit,
   the guiding of the flow of the fluid upstream of the isolation valve element during a filling process, and, possibly,
   the transmission of mechanical movement in order to selectively control the opening or the closing of the downstream isolation valve element, In addition, this architecture of the dust valve element in two portions makes it possible, on the filling outlet, to disconnect (separate) the functions on the one hand of the seal between the connector and the outlet, and, on the other hand, of the mechanical actuating of the isolation valve element.

According to possible particularities:
   the body of the dust valve element slides in the circuit, with the passage or passages forcing all or almost all of the flow of fluid transiting from upstream to downstream in the circuit to pass through the body of said dust valve element, regardless of the downstream position of the dust valve element,
   the connector comprises a first return member urging the first concentric part in the upstream direction in order to close off the upstream end of the circuit, the first return member comprising a first end pressing against a fixed portion of the connector and a second end pressing against said first concentric part, the connector comprising a second return member urging the second concentric part in the upstream direction in order to close off the upstream end of the circuit, the second return member comprising a first end pressing against the first concentric part and a second end pressing against said second concentric part,
   the first concentric part comprises one or more passages in order to guide at least some of the flow of fluid transiting from upstream to downstream through the body of said dust valve element,
   the second concentric part is mounted slidingly in a central internal passage of the first concentric part,
   the isolation valve element can be moved selectively in a downstream position in which the circuit is open via mechanical actuating carried out by the dust valve element,
   the isolation valve element can be moved selectively in a downstream position in which the circuit is open via a flow of fluid under pressure,
   the dust valve element can be moved selectively heading downstream via a mechanical actuating and/or via fluid under pressure, when the dust valve element is in upstream position in which the upstream end of the circuit is closed, the respective upstream ends of the first and second concentric parts each close off a portion of the upstream end of the circuit, the dust valve element comprises a return member urging the second concentric part in the upstream direction in order to close off the upstream end of the circuit, when the second concentric part is moved downstream relative to the first concentric part, this second concentric part opens an additional internal passage to guide at least part of the flow of fluid transiting from upstream to downstream through the body of said dust valve element, when the second concentric part is moved downstream relative to the first concentric part, this second concentric part opens an additional internal passage to guide at least one portion of the flow of fluid transiting from upstream to downstream through the body of said dust valve element, the passage or passages comprise at least one converging portion in order to guide at least part of the gas transiting through the dust valve element to the central portion of the internal filling circuit, the passage or passages converge and guide at least part of the gas transiting through the dust valve element in a parallel manner in the central portion of the internal filling circuit, the passage or passages converge to guide at least part of the gas transiting through the dust valve element to the central portion of the upstream end of the isolation valve element, the passage or passages converge to guide at least one portion of the gas transiting through the dust valve element to a converging zone of the internal filling circuit defining the seat of the isolation valve element, the external and/or internal surface of the body of the connector comprises impressions forming recesses and/or attachment reliefs intended to cooperate with conjugate shapes of a filling outlet in order to form a selective mechanical fastening system, in particular with quick connection, the dust valve element comprises an upstream end which can be actuated mechanically and/or via fluid under pressure, the isolation valve element mobile comprises a flexible sealed lining intended to cooperate with the seat in order to carry out the sealed closing of the circuit when the valve is urged against the seat with a set pressure, in upstream position in which the upstream end of the circuit is closed, said dust valve element closes off in a sealed manner the inlet orifice of the upstream end circuit, for example in a watertight manner, in upstream position in which the upstream end of the circuit is closed, said dust valve element closes off in a non-tight manner the inlet orifice of the upstream end circuit, the body of the connector and/or the dust valve element comprises a flexible lip forming a watertight barrier between the body of the connector and the dust valve element at least when the latter is in upstream closing position, the flexible lip comprises a free end allowing the passage of gas or of liquid when a set pressure differential exists on either side of the lip, in order to allow in particular a possible evacuation of gas from downstream to upstream, for example in the case of a leak of the isolation valve element, in upstream position of the dust valve element, the upstream end of the dust valve element closes the upstream end of the circuit as a flush fit with the upstream end of the body of the connector, the body of the dust valve element slides in a tight or non-tight manner in the circuit, the seal between the dust valve element and the body of the connector is carried out via metal/metal contact and/or via at least one seal, the passage or passages include one or more internal ducts passing through the body of the dust valve element and/or passing through the body of the connector, the passage or passages include at least one spacing between the dust valve element and the body of the connector, in order to force all or almost all of the flow of fluid transiting from upstream to downstream in the circuit to pass through the dust valve element, each return member comprises at least one from among: a compression spring, a tension spring, the downstream end of the dust valve element comprises a rod in order to mechanically actuate the upstream end of the isolation valve element, the upstream end of the isolation valve element comprises a surface intended to cooperate with mechanical contact with the downstream end of the dust valve element, the closing of the isolation valve element is carried out before the closing of the dust valve element, the seat of the isolation valve element is formed by a shoulder of a tubular frame integral with the body of the connector, the isolation valve element sliding in this frame, the downstream end of the dust valve element entering in said frame when the dust valve element comes into downstream position, the connector comprises an abutment intended to cooperate with the dust valve element in order to limit the maximum downstream position of the latter, the abutment intended to cooperate with the dust valve element in order to limit the maximum downstream position of the latter is integral with the body of the connector and/or with a frame integral with the body and defining the seat of the isolation valve element, the isolation valve element comprises a non-return mechanism ("NRV") generating a force on the isolation valve element urging it upstream when the latter is subjected to a fluidic pressure in its upstream portion, the non-return mechanism comprises a channel connecting the upstream end of the isolation valve element to a downstream chamber, in order to transform a fluidic pressure on the upstream portion of the valve element into a force on the downstream end of the isolation valve element which tends to move said isolation valve element into upstream closing position, the non-return mechanism ("NRV") comprises a set surface ratio between on the one hand the upstream end of the isolation valve element subjected to a fluid upstream and, on the other hand, the downstream end of the isolation valve element communicating with the chamber, in order to urge said isolation valve element into upstream closing position when its upstream end is subjected to a fluid under pressure, the dust valve element comprises a filter in order to filter solid particles transiting through said valve element, for example at least one portion of the passages for the fluid passing through the body of the dust valve element comprises at least one filter or a filtration screen for solid particles.

The invention also relates to a tap for fluid under pressure, in particular for gas under pressure, with or without pressure regulator, comprising a filling connector intended to cooperate with a filling outlet in order to allow for the filling of said container via said connector, with the filling connector being in accordance with any of the characteristics hereinabove or hereinbelow.

The invention also relates to a container of fluid under pressure, in particular a bottle of gas under pressure, comprising a tap in accordance with any of the characteristics hereinabove or hereinbelow.

The invention also relates to a filling method for such a container of gas under pressure by means of a filling outlet connected mechanically and in a releasable manner to said filling connector of the container, with the method comprising a first step of moving the dust valve element downstream in order to open the upstream end of the circuit via a mechanical actuating and/or via a fluidic actuating carried out by the filling outlet and a second step of moving the isolation valve element towards a downstream opening position via a mechanical actuating carried out by the dust valve element and/or via a fluidic actuating carried out by the gas delivered by the filling outlet, during the filling at least some of the gas transiting from upstream to downstream is guided in the passage or passages of the dust valve element, through the body of said dust valve element.

According to other possible particularities,
the first step, the dust valve element is moved into its first set downstream position referred to as "without contact" and in that, in the second step, the isolation valve element is moved towards a downstream opening position via a fluidic actuating carried out by the gas delivered by the filling outlet,
during the first step, the dust valve element is moved into its second set downstream position referred to as "contact" and in that in the second step the isolation valve element is moved towards a downstream opening position via a mechanical actuating carried out by the dust valve element,
the dust valve element is moved downstream by the mechanical action of an end of a valve pusher belonging to the filling outlet,
the second concentric part is moved into a position further downstream than the first concentric part in order to mechanically actuate the isolation valve element towards a downstream opening position,
the filling outlet comprises a valve pusher intended to be introduced in a sealed manner into the orifice of the upstream end of the body of the connector in order to push the dust valve element downstream, with the valve pusher comprising an outer sleeve and a central plunger mounted slidingly in the outer sleeve in order to selectively actuate the second concentric part in the downstream direction in relation to the first concentric part,
at the end of the process of filling a container of gas under pressure, the isolation valve element is automatically closed when the mechanical and/or fluid force exerted on the upstream portion of the valve element becomes less than a set threshold,
the filling method comprises a first step of moving the dust valve element towards a downstream position in which the upstream end of the circuit is open via a mechanical actuating and/or a fluidic actuating carried out by the filling outlet and a second step of moving the isolation valve element towards a downstream opening position via a mechanical actuating carried out by the dust valve element,
the opening of the valve element or elements can be carried out independently of the mechanical fastening of the filling outlet on the connector, in particular, the opening of the valve element or elements can be carried out by the filling outlet after the mechanical fastening of the filling outlet on the connector and via a separate actuation of the fastening system.

The invention also relates to a filling outlet intended to provide for the filling of such a container, with the outlet comprising members for the mechanically selective fastening of the outlet on an external surface of a connector, a valve pusher mobile in translation intended to be introduced into the orifice of a connector in order to push back a dust valve element, with the valve pusher comprising an outer sleeve and a central plunger mounted slidingly in the outer sleeve in order to selectively actuate in the downstream direction the second concentric part in relation to the first concentric part, the outer sleeve comprising a sealing member in order to provide for a static seal while the central plunger is selectively moved.

According to other possible particularities:
the filling outlet provided for to cooperate with a filling connector of a tap of a container of fluid under pressure comprises at least one claw extending according to a longitudinal direction around a longitudinal axis, with the central space located between the claw or claws and the longitudinal axis forming a housing intended to receive a filling connector with a generally cylindrical shape, with the internal surface of the at least one claw located facing the central space comprising reliefs and/or recesses of determined dimensions, with the reliefs and/or recesses being spaced relatively from one another in a determined manner in order to fit into grooves and/or conjugate reliefs formed on the external surface of a filling connector, with the at least one claw being mobile transversely in relation to the longitudinal axis between a position referred to as "separated" in order to allow for the introduction of a connector in the central space and a position referred to as "close together" in order to allow for the nesting of the internal surface of the claws on the external surface of a connector,
said outlet comprises a locking member mobile between an active position blocking the claws in close-together position and an inactive position allowing for the moving of the claws towards the separated position,
the outer sleeve comprises at least one sealing member such as an O-ring in order to provide the seal with regards to the outside between the filling outlet and the internal circuit of the connector,
the sealing member of the outer sleeve cooperates in a sealed manner with a cylindrical internal surface of the body of the connector,
the fluid supplied by the filling outlet flows inside the outer sleeve, via a space located between the outer sleeve and the central plunger and/or via an internal passage transiting inside the central plunger,
the outer sleeve and central plunger unit is selectively mobile in translation relatively to the fastening members of the filling outlet provided for the fastening of the outlet on a connector.

The invention can also relate to any alternative device or method comprising any combination of the characteristics hereinabove or hereinbelow.

BRIEF DESCRIPTION OF THE DRAWINGS

Other particularities and advantages will appear when reading the description hereinafter, made in reference to the figures wherein.

DESCRIPTION OF PREFERRED EMBODIMENTS

Figure 1:
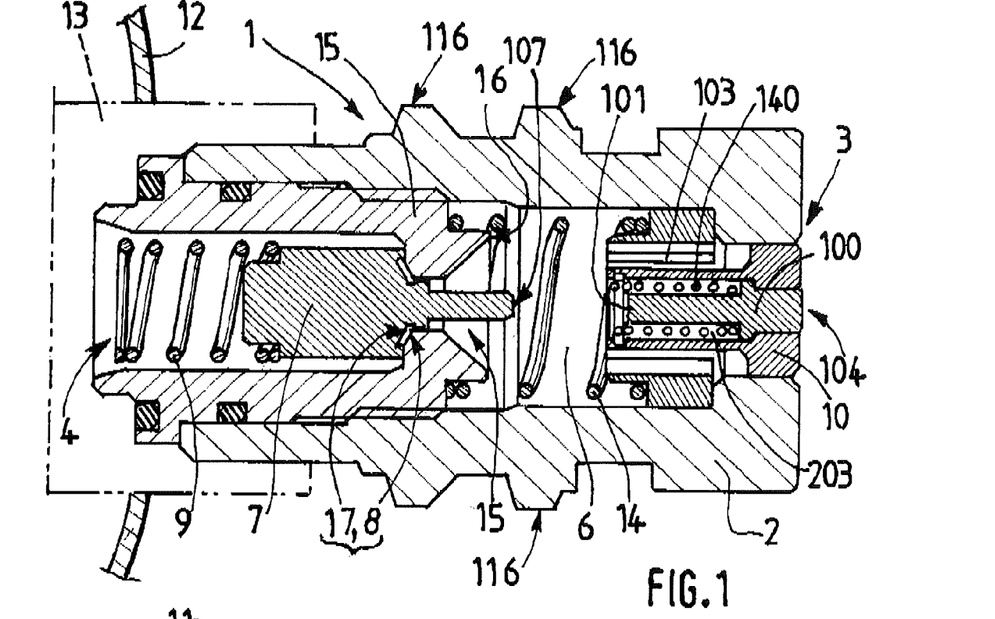
FIG. 1 shows a cross-section, diagrammatical and partial view, showing a first embodiment of a filling connector according to the invention in a closed position and mounted on a tap of a container.

In reference to FIG. 1, the filling connector 1 comprises a body 2, for example of a general cylindrical shape. The body 2 defines an internal filling circuit 6 between an upstream end 3 intended to be connected to a filling outlet and a downstream end 4 intended to be connected with a container of gas under pressure (via for example an internal circuit of a tap).

In the example of FIG. 1, the downstream end of the body of the connector 1 is fixed to a tap 13, for example by screwing. The tap 13 (diagrammed as a dotted line) is fixed on the orifice of a reservoir 12 such as a bottle of fluid under pressure.

The upstream end 3 of the circuit 6 (and of the connector 1) can be selectively closed again by a dust valve element 10, 100 mobile in the body 2 of the connector.

The dust valve element 10, 100 is selectively mobile in the body 2 (preferably in translation) between an upstream position in which the upstream end 3 of the circuit 6 is closed and a downstream position in which the upstream end 3 of the circuit is open. Preferably, the dust valve element 10, 100 is urged into its upstream position by at least one return member 14, for example a spring such as a compression spring.

More preferably, in upstream position in which the upstream end 3 of the circuit 6 is closed, the dust valve element 10, 100 is housed in the body 2 of the connector and is flush with the external surface of the body 2 of the connector 1.

The dust valve element 10, 100 closes the upstream inlet 3 of the circuit in a tight or non-tight manner by contact with the body 2 of the connector 1. The body of the dust valve element 10, 100 can comprise one or more seals closing off the circuit 6 in a sealed manner.

According to an advantageous particularity, the dust valve element 10, 100 comprises a first 10 and a second 100 concentric parts able to be moved in relation to one another according to the upstream-downstream direction.

For example, a first return member 14 such as a spring urges the first concentric part 10 upstream in order to close off the upstream end 3 of the circuit. This first return member 14 comprises more preferably a first end pressing against a fixed portion of the connector and a second end pressing against said first concentric part 10. The first concentric part 10 comprises one or more passages 103 in order to guide at least one portion of the flow of fluid transiting from upstream 3 to downstream 4 through the body of said dust valve element 10, 100 when the latter is open.

The end upstream position of the first concentric part 10 can be defined by an abutment between this first concentric part 10 and the connector body 2.

The connector comprises a second return member 140 urging the second concentric part 100 upstream in order to close off the upstream end 3 of the circuit. The second return member 140, for example a spring, comprising a first end pressing against the first concentric part 10 and a second end pressing against said second concentric part 100. That is to say, the second concentric part 100 is mounted mobile on the first concentric part 10.

Preferably, the second concentric part 100 has the shape of an axis that is mounted slidingly in an internal central passage 203 of the first concentric part 10.

When the dust valve element 10, 100 is in upstream position in which the upstream end 3 of the circuit 6 is closed, the respective upstream ends of the first 10 and second 100 concentric parts each close off a portion of the upstream end 3 of the circuit 6. Preferably, the upstream ends of the first 10 and second 100 concentric parts are flush in the same plane as the planar upstream end of the connector.

Preferably, the first 10 and second 100 concentric parts have conjugate shapes that provide via abutment a maximum upstream position of the second concentric part 100 in relation to the first 10.

More preferably also, when the second concentric part 100 is moved downstream relatively to the first concentric part 10, this second concentric part 100 opens an additional internal passage 203 in order to guide at least part of the flow of fluid transiting from upstream 3 to downstream 4 through the body of said dust valve element 10.

The passage or passages 103, 203 can where applicable comprise at least one converging portion in order to guide at least some of the gas transiting through the dust valve element 10, 100 towards the central portion of the internal filling circuit.

The passage or passages 103, 203 can comprise parallel portions in the central portion of the internal filling circuit.

These internal passages guide at least some of the gas transiting through the dust valve element 10, 100 towards the central portion of the upstream end 107 of the isolation valve element 7.

That is to say that, when a gas transits from upstream 3 to downstream 4, the passage or passages 103 force all or almost all of the flow of gas to pass through the body of the dust valve element 10,100 regardless of the downstream position of the dust valve element 10, 100. The passages 103 can include internal ducts passing through the body of the valve element 10. Alternatively or in a combination, it is possible to consider ducts or passages that pass through the body 2 of the connector 1. Likewise, alternatively or in a combination, it is possible to consider one or more passages 103 formed by a spacing between the dust valve element 10 and the body 2 of the connector. Alternatively or in a combination when the dust valve element 10 opens the upstream end 3 of the circuit 6, the gas under pressure transits downstream by bypassing the dust valve element 10, 100 (that is to say that the gas passes between the dust valve element 10 and the body 2 of the connector).

Downstream of the dust valve element 10, 100, the circuit 6 contains an isolation valve element 7 mobile relatively to a seat 8. The isolation valve element 7 is mobile preferably in translation between an upstream position in which the circuit is closed and a downstream position in which the circuit is open. The isolation valve element 7 is urged by default towards its upstream position by a return member 9 such as a spring, in particular a compression spring.

As shown, the isolation valve element 7 can comprise a flexible sealed lining 17 intended to cooperate with the seat 8. The flexible lining can include plastic, a polymer, a vulcanized rubber or any other suitable material.

As shown, without being a requirement, the seat 8 of the isolation valve element 7 can be formed by an annular shoulder integral with a tubular frame 15 fixed in the body 2 of the connector (for example by tight screwing).

For example, the isolation valve element 7 slides in this frame 15. An end 16 of this frame 15 or of the seat 8 can for example form an abutment 16 intended to cooperate with the dust valve element 10 in order to limit the maximum downstream position of the latter. Likewise, the spring 14 of the first concentric part 10 can press against this frame 15.

Thus the dust valve element 10 comprises an upstream end or surface 104 which can be actuated mechanically (that is to say by mechanical contact) and/or via fluid under pressure.

Figure 2:
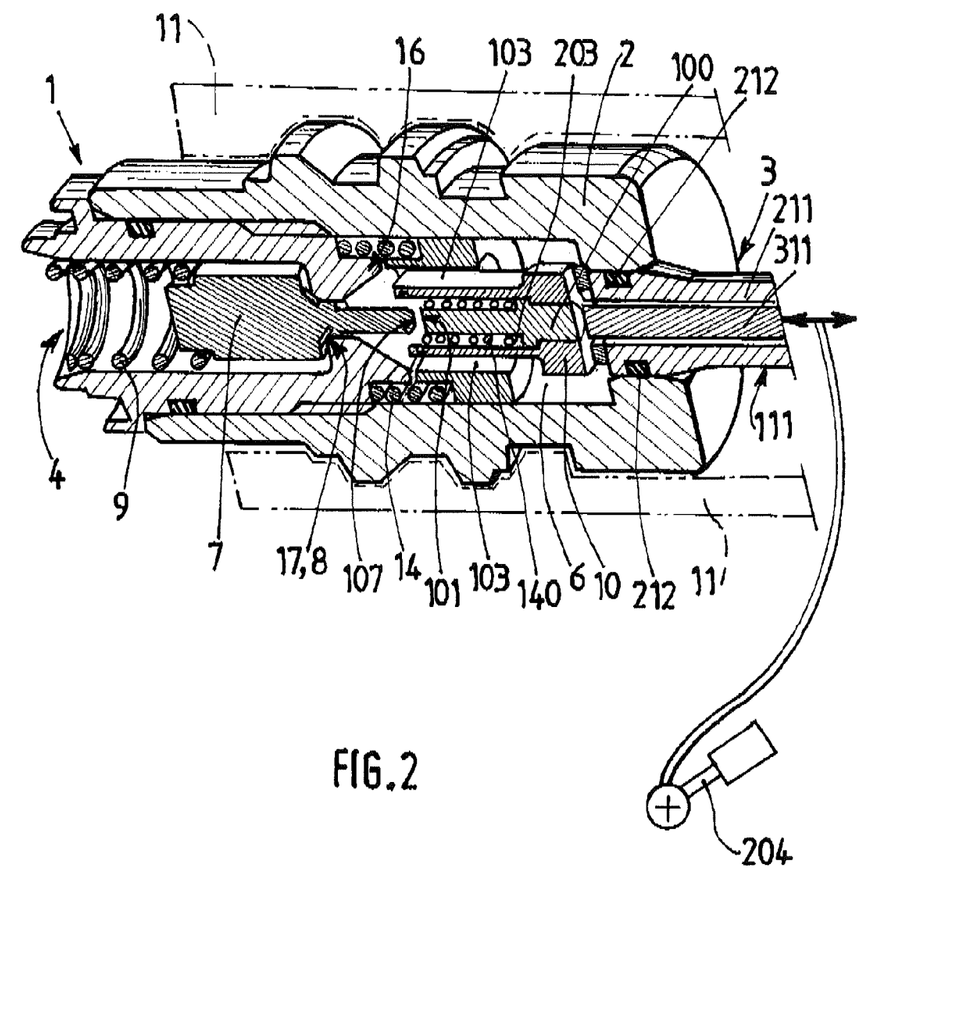
FIG. 2 shows a perspective, diagrammatical and partial cross-section view, showing the filling connector of FIG. 1, in a position connected to a filling outlet, with the isolation valve element of the connector closed.
Figure 3:
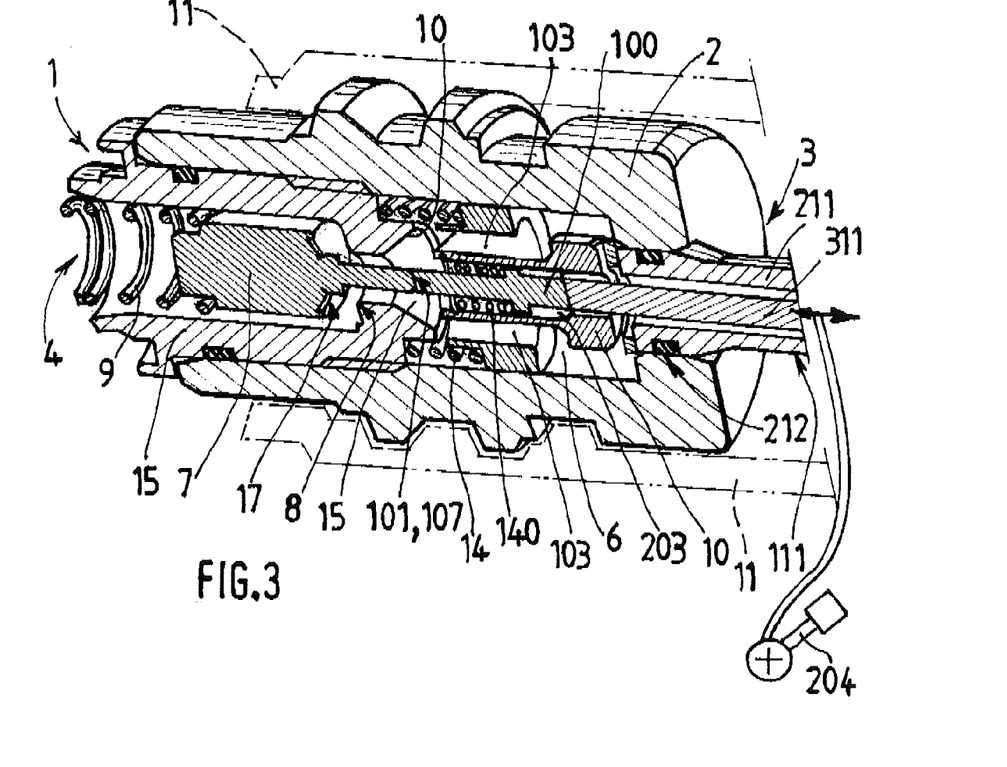
FIG. 3 shows a perspective, diagrammatical and partial cross-section view, showing the filling connector of FIG. 1, in a position connected to a filling outlet, with the isolation valve element of the connector open.

In FIGS. 2 and 3 a filling outlet 11 opening the connector 1 is shown symbolically (as a dotted line for its external portion and as solid lines for its internal portion).

Preferably, the external surface of the body 2 of the connector 1 comprises impressions 116 forming recesses and/or attachment reliefs intended to cooperate with conjugate shapes of a filling outlet 11 in order to form a system of mechanical fastening, in particular with quick connection (not shown in detail). In particular, more preferably, the impressions 116 are sized and positioned according to a set geometry, in order to preferably be adapted to a determined conjugated filling outlet 11 (and solely to the latter).

As shown in FIG. 3, the dust valve element 10 can be moved selectively downstream by a mechanical actuating, for example by a valve pusher 111 that is selectively mobile in response to an actuator such as a swivel lever 24 for example. The movement of the valve pusher 111 can also be obtained automatically, for example pneumatically or and/or via an electromagnetic system.

The valve pusher 111 is preferably introduced into the connector in a sealed manner and delivers gas under pressure via an internal or external channel to the valve pusher 111.

In a possible embodiment shown in FIGS. 2 and 3, the valve pusher (111) comprises an outer tubular sleeve 211 and a central plunger 311 mounted slidingly in the outer sleeve 211.

The central plunger 311 is provided in order to selectively actuate towards downstream the second concentric part 100 in relation to the first concentric part 10.

More preferably, the outer sleeve 211 has a diameter that corresponds to the diameter of the opening of the upstream end 3 of the connector. In addition, the outer sleeve comprises a sealing member 212, such as an O-ring that provides the static seal between the connector and the outlet 11 with regards to the exterior. The sealing member 212 of the outer sleeve 211 cooperates in a sealed manner with an internal surface of cylindrical shape of the body 2 of the connector.

Thus, in a first phase, when the outlet is connected to the connector 1, the outer tubular sleeve 211 and the central plunger 311 can push back the two concentric parts 10, 100 of the dust valve element. The outer sleeve 211 provides the connecting seal.

Where applicable, the outer sleeve 211 and central plunger 311 unit is selectively mobile in translation relatively to the fastening members provided for the fastening of the outlet on the connector.

In a second phase, the central plunger 311 can be moved selectively downstream relatively to the outer sleeve 211 in order to selectively actuate towards downstream the second concentric part 100 in relation to the first concentric part 10 (cf. FIG. 3). During this second phase, the seal provided by the outer tubular sleeve 211 remains static.

In this way, by moving the second concentric part 100 downstream, it is possible to mechanically actuate the upstream end 107 of the isolation valve element in order to move the latter and open the connector.

The fluid (gas for example) supplied by the filling outlet 11 can flow for example inside the outer sleeve 211, via a space located between the outer sleeve 211 and the central plunger 311. Alternatively or as a combination, the fluid can flow via an internal passage (not shown) arranged inside the central plunger 311.

As can be seen in FIG. 3, when the second concentric part 100 of the dust valve element is brought into a determined downstream position referred to as "contact" (with the upstream end 3 open), a downstream end 101 of the second concentric part 100 comes to push an upstream end 107 of the isolation valve element 7 in order to move the isolation valve element 7 towards its downstream position in which the circuit 6 is open.

That is to say that the isolation valve element 7 can be moved selectively into a downstream position in which the circuit is open by mechanical actuating carried out by the dust valve element 10, 100.

To this effect, as shown in the figures, the second concentric part 100 of the dust valve element 10 can comprise a downstream end 101 in the shape of a rod the end surface of which is provided in order to mechanically actuate the upstream end of the isolation valve element 7. The upstream end of the isolation valve element 7 can also be formed by a rod that protrudes upstream in relation to the seat 8 with a generally annular shape.

Figure 4:
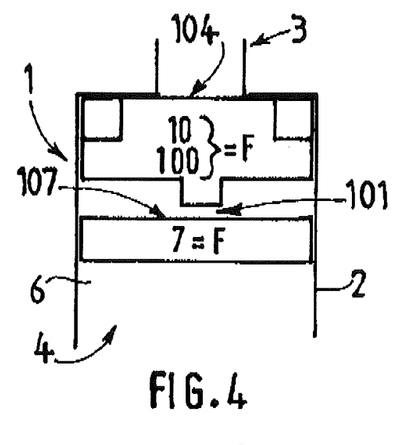
FIG. 4 shows a diagrammatical and partial cross-section view, showing the structure of a filling connector according to the invention in a closed position (two valve elements closed)
Figure 5:
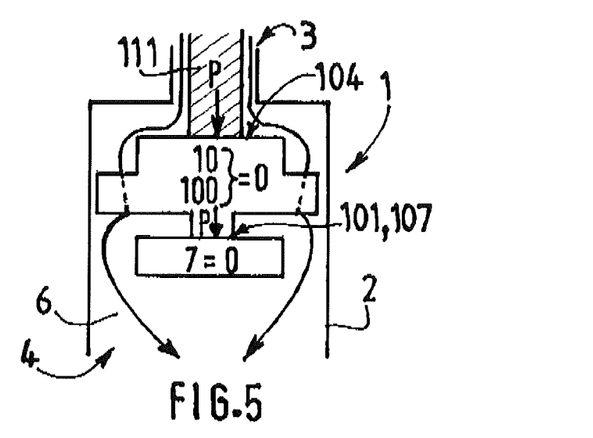
FIG. 5 shows the filling connector of FIG. 4 in an open position (two valve elements open by mechanical contact)

As such, starting from the closed position (dust valve element 10, 100 closed F and isolation valve element closed F) shown diagrammatically in FIG. 4, a filling outlet 11 can mechanically push the upstream end 104 of the dust valve element 10, 100 (pressure P). The dust valve element 10, 100 is moved downstream. The inlet of the circuit 6 of the connector 2 is open (FIG. 5). The downstream end 101 of the dust valve element 10, 100 comes in turn to push the upstream end 107 of the isolation valve element 7 (mechanical pressure P) which then opens the downstream end of the circuit 6. The flow of gas under pressure can transit from upstream to downstream (symbolised by the arrows).

Figure 6:
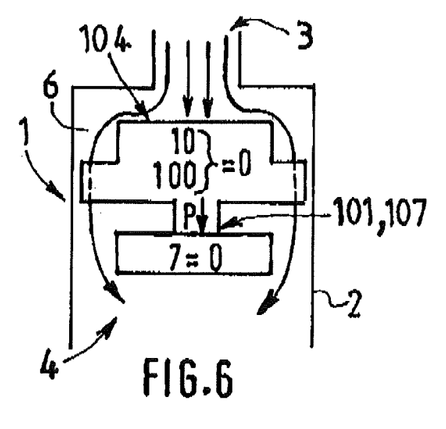
FIG. 6 shows the filling connector of FIG. 4 in an open position (two valve elements open respectively by gas pressure and by mechanical contact)

Of course, this method of opening and of filling is not limited to this example. Thus, as shown in FIG. 6, according to the filling conditions, the upstream end 104 of the dust valve element 10, 100 can be pressed downstream by the flow of gas itself (symbolised by arrows). The downstream end 101 of the dust valve element 10, 100 can then mechanically push (pressure P) the isolation valve element 7.

Figure 7:
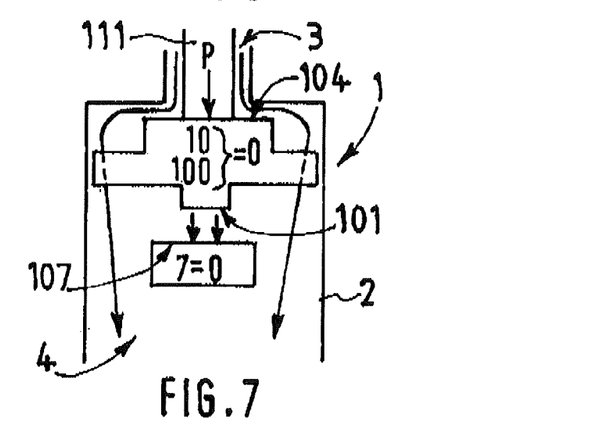
FIG. 7 shows the filling connector of FIG. 4 in an open position (two valve elements open respectively by mechanical contact and by gas pressure)

In the alternative of FIG. 7, the dust valve element 10, 100 is opened (O) mechanically by a filling outlet 11 (pressure P) but the isolation valve element 7 is opened (O) not by the downstream end 101 of the dust valve element 10, 100 but by the force exerted by the pressure of the entering gas.

Figure 8:
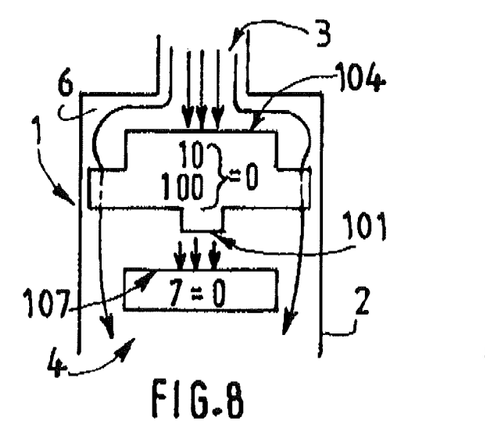
FIG. 8 shows the filling connector of FIG. 4 in an open position (two valve elements open by gas pressure)

In the alternative of FIG. 8, the dust valve element 10, 100 and the isolation valve element 7 are opened (O) by the force exerted by the pressure of the filling gas.

Thus it is easily understood that, according to the geometry of the filling outlet and the filling conditions (in particular the flow rate and the pressure of the filling gas introduced into the connector by the filling outlet 11), the two valve elements 10, 100; 7 in series can be opened (moved downstream) by a mechanical contact and/or by the pressure of the filling gas.

This provides a high degree of flexibility in terms of use to the connector according to the invention. Indeed, the filling of gas provides in all cases a protection of the isolation valve element 7.

Furthermore, the opening of the connector during a filling can be obtained by a sequential opening of the two valve elements 10, 100; 7 in series (first the dust valve element 10, 100 then the isolation valve element 7).

At the end of the process of filling a container of gas under pressure, the isolation valve element 7 is automatically closed by the action of the spring 9 when the mechanical and/or fluid force exerted on the upstream portion of the valve element 7 becomes less than a set threshold. During the end of the operation of filling the isolation valve element 7 closes in principle before the dust valve element 10, 100 closes.

The structure according to the invention furthermore makes it possible to set up filling procedures that are particularly effective in terms of safety for operators that provide for the filling and for the end users of the tap provided with such a connector.

Thus, for example, the dust valve element 10, 100 mobile adopts, while it is moved, at least two sealed positions making it possible to secure the filling.

Figure 9:
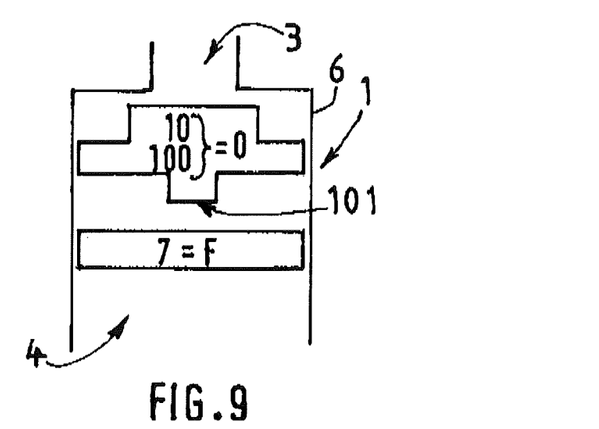
FIG. 9 shows the filling connector of FIG. 3 in a closed test position (upstream valve element open and downstream valve element closed).

In a first sealed position, the dust valve element 10, 100 is moved downstream and opens the upstream of the circuit 6 without the isolation valve element 7 being open (cf. FIG. 9). In this open position (O) of the upstream valve element 10, 100 and closing position (F) of the downstream valve element 7, the chamber located upstream of the isolation valve element 7 can be put under vacuum (determined low pressure) for example by a filling tool in order to carry out tests prior to the filling. In this configuration it is indeed possible to measure any leaks coming from the isolation valve element 7.

In another sealed position the isolation valve element 7 can also be opened in order to provide a filling and/or in order to carry out a possible purge of the circuit 6 and of the bottle before the filling (cf. for example the configuration of FIG. 5 but with an inverted flow of gas in the event of a purge).

At the end of filling, the isolation valve element 7 can be closed again and the dust valve element 10, 100 can be maintained open (cf. FIG. 9) in order to carry out any tests on sealing at the end of filling such as those described hereinabove prior to the filling.

These methods of filling make it possible to guarantee the safety of the filling and the strength of the seal of the connector after multiple fillings.

The use of this connector on gas taps more preferably provided with pressure regulators offers many advantages. Indeed, the containers (bottles for example) of gas provided with such taps can be filled in complete safety and can retain the same filling connector without however jeopardising the seal on the connector.

The filling method according to the invention as such makes it possible to improve the protection of the lining of the sealing valve against pollution (metal particles, dust, etc.) via the mobile dust valve element moved during the filling.

This makes it possible to increase the reliability of the seal of the connector during the service life of the tap and of the bottle that is provided with it.

According to the invention, the mechanical thrust on the isolation valve element 7 remains possible but solely via the dust valve element 10, 100.

The filling method according to the invention thus makes it possible to improve the safety of the filling via the actuating of the mechanism with two valve elements in series described hereinabove.

The invention is advantageously applied to the filling connectors and filling systems for bottles of gas under pressure for example between 150 and 750 bar) provided with taps with integrated regulators or detachable regulators.

The filling connector can where applicable also be the connector for withdrawing gas.

The invention claimed is:

1. A filling connector for a container of fluid under pressure intended to cooperate with a filling outlet in order to allow for the filling of said container, the filling connector (1) comprising a body (2) defining an internal filling circuit (6) between an upstream end (3) intended to be connected to a filling outlet and a downstream end (4) intended to be connected to a container, the filling connector comprising
a) an isolation valve element (7) mobile, relative to a seat (8), between an upstream position in which the circuit is closed and a downstream position in which the circuit is open, said isolation valve element (7) being urged into its upstream position by a return member (9),
b) the filling connector (1) further comprising a dust valve element (10, 100) positioned upstream of the isolation valve element (7), said dust valve element (10, 100) comprising a downstream end (101) and being mobile, relative to the body (2), between an upstream position in which the upstream end (3) of the circuit (6) is closed and a downstream position in which the upstream end (3) of the circuit is open, said dust valve element (10, 100) being urged into its upstream position by at least one return member (14, 140),
c) wherein the dust valve element (10, 100) can be moved selectively heading downstream either:
in a first set downstream position referred to as "without contact" which opens the upstream end (3) of the circuit (6), wherein the downstream end (101) of the dust valve element (10, 100) does not push the upstream end (107) of the isolation valve element (7), the upstream end (107) of the isolation valve element (7) being able to be pushed towards its downstream position in which the circuit (6) is open by fluid under pressure entering through the upstream open end (3) of the circuit (6), or in
a second set downstream position referred to as "contact" which opens the upstream end (3) of the circuit (6), wherein the downstream end (101) of the dust valve element (10, 100) pushes an upstream end (107) of the mobile isolation valve element (7) in order to move via contact the isolation valve element (7) towards its downstream position in which the circuit (6) is open and in that the dust valve element (10, 100) comprises a passage or passages (103) in order to guide at least some of the flow of fluid transiting from upstream (3) to downstream (4) through the body of said dust valve element (10), and d) wherein the dust valve element (10, 100) comprises a first (10) and a second (100) concentric parts able to be moved in relation to one another according to the upstream-downstream direction.

2. The filling connector according to claim 1, wherein the filling connector comprises a first return member (14) urging the first concentric part (10) upstream to close off the upstream end (3) of the circuit, the first return member (14) comprising a first end pressing against a fixed portion of the connector and a second end pressing against said first concentric part (10), the connector comprising a second return member (140) urging the second concentric part (100) upstream to close off the upstream end (3) of the circuit, the second return member (140) comprising a first end pressing against the first concentric part (10) and a second end pressing against said second concentric part (100).

3. The filling connector according to claim 1, wherein the first concentric part (10) comprises one or more passages (103) in order to guide at least some of the flow of fluid transiting from upstream (3) to downstream (4) through the body of said dust valve element (10, 100).

4. The filling connector according to claim 1, wherein the second concentric part (100) is mounted slidingly in a central internal passage (203) of the first concentric part (10).

5. A tap (12) for fluid under pressure, with or without pressure regulator, comprising a filling connector according to claim 1.

6. A container of fluid under pressure comprising a tap (12) in accordance with claim 5.

7. A filling method for a container of gas under pressure in accordance with claim 6 by means of filling outlet (11) connected mechanically and in a releasable manner to said filling connector (1) of the container (13), the method comprising a first step of moving the dust valve element (10, 100) downstream in order to open the upstream end of the circuit (6) via a mechanical actuating and/or via a fluidic actuating carried out by the filling outlet (11) and a second step of moving the isolation valve element (7) towards a downstream opening position via a mechanical actuating carried out by the dust valve element (10, 100) and/or via a fluidic actuating carried out by the gas delivered by the filling outlet, during the filling at least one portion of the gas transiting from upstream (3) to downstream (4) is guided in the passage or passages (103, 203) of the dust valve element (10), through the body of said dust valve element (10, 100).

8. The method according to claim 7, wherein, during the first step, the dust valve element (10, 100) is moved into its first set downstream position referred to as "without contact" and in that, in the second step, the isolation valve element (7) is moved towards a downstream opening position via a fluidic actuating carried out by the gas delivered by the filling outlet.

9. The method according to claim 7, wherein, during the first step, the dust valve element (10, 100) is moved into its second set downstream position referred to as "contact" and in that in the second step the isolation valve element (7) is moved towards a downstream opening position via a mechanical actuating carried out by the dust valve element (10, 100).

10. The method according to claim 7, wherein the dust valve element (10, 100) is moved downstream by a mechanical action of an end of a push-valve (111) belonging to the filling outlet (11).

11. The method according to claim 7, wherein the second concentric part (100) is moved into a position further downstream than the first concentric part (10) in order to mechanically actuate the isolation valve element (7) towards a downstream opening position.

12. The method according to claim 7, wherein the filling outlet (11) comprises a valve pusher (111) intended to be introduced in a sealed manner into the orifice of the upstream end (3) of the body (2) of the connector in order to push back the dust valve element (10, 100) heading downstream, with the push-valve (111) comprising an outer sleeve (211) and a central plunger (311) mounted slidingly in the outer sleeve (211) in order to selectively actuate towards downstream the second concentric part (100) in relation to the first concentric part (10).

\* \* \* \* \*